(12) United States Patent
Stumpf et al.

(10) Patent No.: US 7,805,559 B1
(45) Date of Patent: Sep. 28, 2010

(54) USB REPEATER FOR ON BOARD AIRCRAFT INSTALLATIONS

(75) Inventors: Joshua Stumpf, Mission Viejo, CA (US); Bradford B. Billings, Lake Forest, CA (US); Bradley Foreman, Mission Viejo, CA (US)

(73) Assignee: Thales Avionics, Inc., Irvine, CA (US)

( * ) Notice: Subject to any disclaimer, the term of this patent is extended or adjusted under 35 U.S.C. 154(b) by 18 days.

(21) Appl. No.: 12/421,668

(22) Filed: Apr. 10, 2009

(51) Int. Cl.
*G06F 13/20* (2006.01)
(52) U.S. Cl. .......................................... 710/313; 710/62
(58) Field of Classification Search ......... 710/300–315, 710/8–12, 62–64, 72
See application file for complete search history.

(56) References Cited

U.S. PATENT DOCUMENTS

| | | | |
|---|---|---|---|
| 6,862,643 B2 * | 3/2005 | Wu et al. | 710/302 |
| 7,383,362 B2 * | 6/2008 | Yu et al. | 710/22 |
| 2003/0041205 A1 * | 2/2003 | Wu et al. | 710/302 |
| 2008/0157997 A1 * | 7/2008 | Bleacher et al. | 340/825.24 |
| 2008/0309297 A2 * | 12/2008 | Brown et al. | 323/234 |

* cited by examiner

*Primary Examiner*—Raymond N Phan
(74) *Attorney, Agent, or Firm*—Drinker Biddle & Reath LLP

(57) ABSTRACT

A USB repeater assembly is provided for connecting a vehicle passenger entertainment system to a seat electronics box that may be at some distance from the entertainment system. The assembly comprises a host connector that connects with the seat electronics box and a device connector that connects with the passenger entertainment system. The passenger entertainment system comprises a USB personal control unit. The repeater assembly is housed within a shell, preferably a hardened one, enclosing a portion of the connectors as well as USB repeater circuitry and through-connects for connections associated with other components of the passenger entertainment system.

16 Claims, 6 Drawing Sheets

USB REPEATER FOR ON BOARD AIRCRAFT INSTALLATIONS

BACKGROUND

The invention relates to human interface devices and specifically to the connection of a user personal control unit (PCU) to a controlling seat electronics box (SEB) used on an in-flight entertainment (IFE) system of an aircraft or an in-travel system of a vehicle. Specifically, this invention relates to the data transport mechanism and associated cabling that interfaces between the human interface device and the SEB.

An in-flight entertainment (IFE) system (this term, as used herein, applies to any in-transit vehicle entertainment system), usually comprises a server or series of servers located in a common, centralized location on an aircraft that is capable of distributing multimedia content, and real-time interactive data (games) to passengers. In these systems, it is common for the passenger to be provided with a passenger system having a video display unit (VDU) with a video interface, an audio interface, and a personal control unit (PCU) that can be used to interact with the passenger system.

These systems and associated interfaces require sophisticated electronics for data delivery between the IFE and the passenger system. Often the communications link will comprise an area distribution network (ADN) that handles the transmission of communications targeted to or originating from a particular area of the aircraft to a central computer.

For data that is ultimately targeted to or sent from the passenger system, it is not unusual to have a substantial amount of electronic equipment that is required to handle tasks such as decoding audio and video information, handling game control information, and the like. Unfortunately, the area in which the passenger sits is often crowded, and therefore it is advantageous to have the necessary electronics located away from the seat, but minimally so, in a seat electronics box (SEB).

The SEB can be located in an area near a passenger seat, yet far enough away so that it does not take up valuable room within the seating area of the passenger. Although for certain purposes it is desirable to locate the SEB as close to the passenger seat as possible, for other purposes, it may be desirable to locate the SEB further away. For example, it may be practical because of cost, weight, or space savings, to use a quad seat electronics box (QSEB) that is capable of serving four passenger entertainment systems. Thus, the SEB may be located further away from the passenger entertainment system than is desirable to achieve certain goals.

One of the components of information handled by the SEB is the information generated by PCU of the user. The PCU is often, but not necessarily, a handheld unit. This PCU permits the passenger to control various aspects of the entertainment system, such as channel or video-on-demand selection, provide input for video games, etc.

It is desirable to use standard communications protocols for communicating information to and from the PCU, and one such standard is the Universal Serial Bus (USB) standard. It is thus advantageous to utilize the USB standard for communicating information from the PCU to the SEB.

One problem with the current systems is that USB cables that are used between the SEB and the PCU are limited to five meters due to the constraints of USB technology. Although communications problems due to long-run cabling can be addressed by limiting disconnects (connectors) and using high quality cables to some small degree, this does not alleviate the problem of communication reliability.

The use of USB repeaters for extending the reach of USB devices is known. However, these known USB repeaters are generally somewhat large and heavy and do not have a great deal of robustness and reliability, particularly for achieving the size and weight constraints, robustness and reliability as required by the aerospace regulations, and are not capable of accommodating other signals.

What is needed is a reliable mechanism that conforms to aerospace regulations, and that allows for extending the range of devices connected via USB and is adapted for the aircraft or vehicle environment. Specifically, it is desirable to maximize customer satisfaction when they are using their PCU device to control the IFE system while at the same time addressing the concerns of the vehicle owners in minimizing costs associated with weight, etc.

SUMMARY

To solve this problem, a USB repeater/hub is provided that permits extending the length over which USB connected devices can communicate while at the same time permitting a pass-through of other signals. The USB bus specification allows for extending the range, in five meter increments, by using a repeater. By packaging a USB repeater/hub in the appropriate package, with the appropriate connectors, a USB repeater can be made that can pass the rigorous qualification (FAA) requirements for an IFE system.

Specifically, a USB repeater assembly is provided comprising: a host connector that connects to a seat electronics box (SEB) associated with a passenger entertainment system, the host connector comprising: a plurality of Universal Serial Bus (USB) pins associated with the USB connection to the PCU; and a plurality of entertainment device pins associated with other components of the passenger entertainment system. The assembly further comprises: a device connector that connects to the passenger entertainment system, the passenger entertainment system comprising a personal control unit (PCU) configured as a USB device, the device connector comprising: a plurality of USB pins associated with a USB connection to the PCU; and a plurality of entertainment system device pins associated with other components of the passenger entertainment system; direct connections that connect the device connector plurality of entertainment system device pins to the host connector plurality of entertainment device pins. The assembly further comprises: USB repeater circuitry to which the device connector plurality of USB pins and the host connector plurality of USB pins are connected via connectors; and a shell that encloses: at least a portion of the device connector; at least a portion of the host connector; the direct connections; and the USB repeater circuitry and its connectors.

DESCRIPTION OF THE DRAWINGS

The invention is described below with reference to the drawings illustrating a preferred embodiment of the invention.

DETAILED DESCRIPTION OF THE PREFERRED EMBODIMENTS

According to various embodiments of the invention, the USB repeater extends a range of connection between the personal control unit (PCU) and the seat electronics box (SEB), which may span a greater distance than the USB specification permits.

Figure 1:
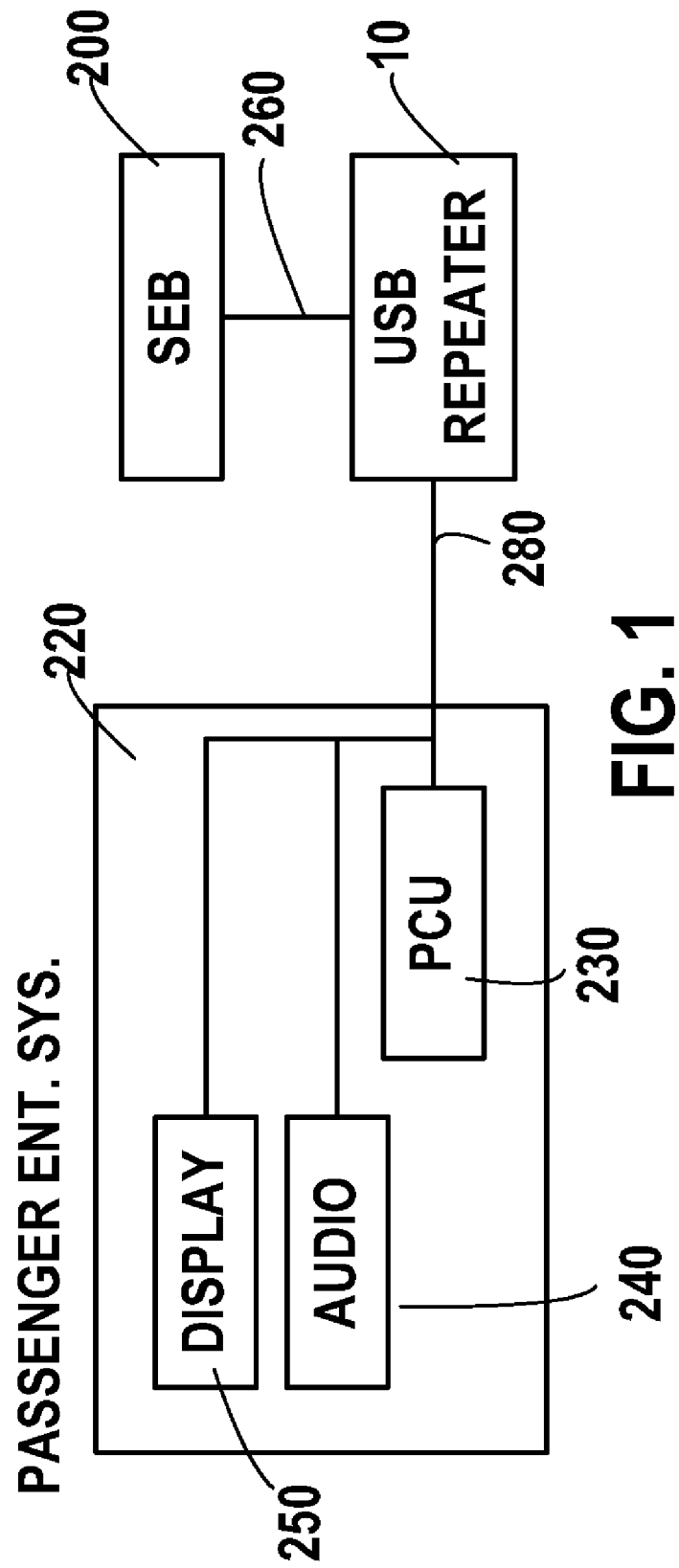
FIG. 1 is a block diagram illustrating the basic components of a passenger entertainment system up to the seat electronics box.

FIG. 1 is a block diagram illustrating a typical configuration that might be used according to an embodiment of the invention. A passenger entertainment system 220 typically comprises an audio component 240 and a display 250 via which a passenger can watch movies, play video games, obtain status information about the flight, surroundings, listen to music, etc. The PCU 230 provides a mechanism via which the user can control the audio 240 and display 250 components of the entertainment system 220.

In the prior art, signals from the PCU 230 (and other components 240, 250) were directly connected by a cable to the SEB 200. However, since the desirability of using the USB standard for communicating PCU information was recognized, and since a distance between the PCU 230 and the SEB 200 might exceed the five-meter limit imposed by the USB specification, a USB repeater 10 is provided, having a cable 260 that connects the SEB 200 to the USB repeater, and another cable 280 that connects the PCU 230 to the USB repeater 10.

Although theoretically the PCU cable 280 could be provided as a traditional USB connector cable, it is highly desirable to group all cables associated with the passenger entertainment system 220 into a single cable 280. This permits easier routing, more comprehensive shielding, and an easier diagnostic capability in case of problems.

FIGS. 2A-2D illustrate an embodiment of the USB repeater 10. As can be seen, this embodiment is created in a form factor similar to D-backshell connector adapters. Accordingly, the repeater 10 has a host (or SEB) connector 20 that is arranged as a DB-26 connector. The host connector 20 may be fitted with spring latches 22 or with sliding guides to ensure easy and reliable connection to the SEB cable 260.

The repeater 10 also has a device connector 30 that connects with the personal control unit cable 280 (which, in this embodiment, comprises other signals associated with the entertainment system 220). The device connector 30 can also be arranged as a DB-26 connector. This connector could be used to mount the repeater 10 to a wall or a frame element that holds the repeater 10.

The repeater 10 comprises a top shell 40 and a bottom shell 42 that protects the internal components. In a preferred embodiment, the shell 40, 42 is comprised of a conductive metal, metalized plastic, or metalized composite, in order to electrically shield the internal components from electrical interference. In one embodiment, the shell 40, 42 is made of aluminum or an aluminum alloy. The shell 40, 42 and components may further comprise additional electrostatic discharge (ESD) elements such as grounding, etc.

In a preferred embodiment, the dimensions of the main body and connectors (without spring latches or attachment plates) for the unit are approximately 7.6 cm.×4.2 cm.×1.75 cm., and do not exceed any one of these dimensions, and the unit has a mass of approximately 36 g. This design thus satisfies the design objectives of providing a small and lightweight device that is hardened to conform with U.S. Aviation regulations.

Figure 2A:
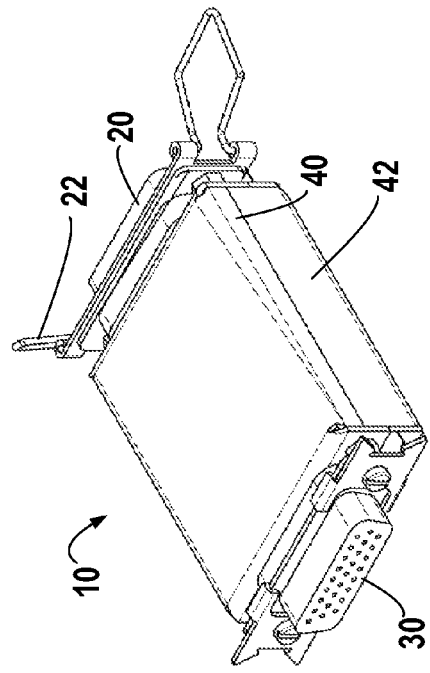
FIGS. 2A-C are pictorial views of an embodiment of the USB repeater device.
Figure 2B:
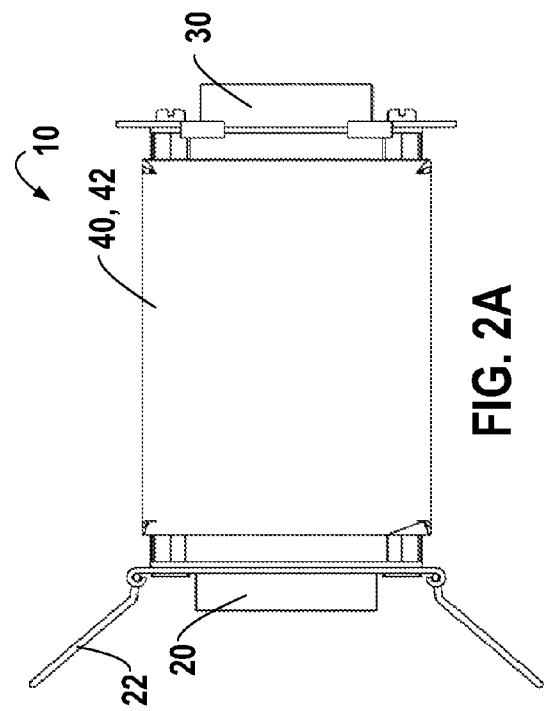
Figure 2C:
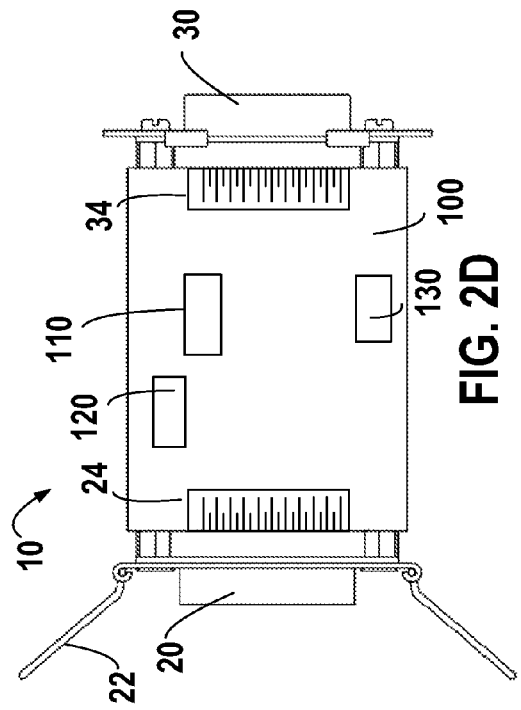
Figure 2D:
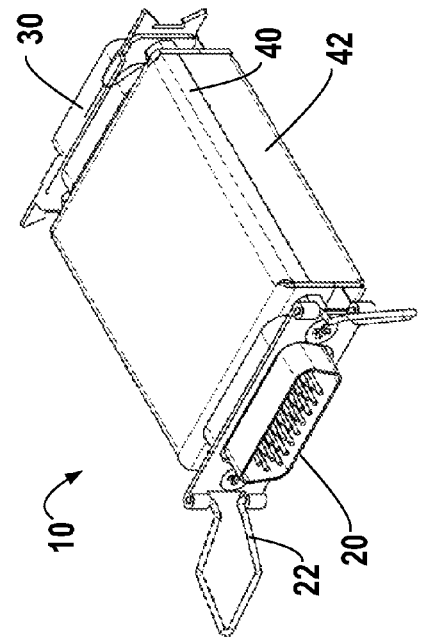
FIG. 2D is a top view of the device shown in FIGS. 2A-C with the top cover removed, exposing the circuit board.

FIG. 2D provides a top view of the repeater 10 with the top shell 40 removed. Angled PCB pins 24, 34 are provided to connect the host connector 20 and the device connector 30, respectively, to the printed circuit board (PCB) 100. A USB repeater chip 110 is provided on the PCB 100. Preferably the chip 110 is an industrial-grade USB hub chip that is commercially available, such as the SMSC's USB25/2I, the specification sheet herein incorporated by reference—advantageously, this controller permits hot swapping of the device.

ESD protectors 120 may also be provided on the PCB 100, such as California Micro Devices CM1213-02SS, the specification being herein incorporated by reference. Furthermore, current sense circuitry 130 may be provided on the PCB 100, such as Maxim's MAX1693EUB, the specification being herein incorporated by reference. The ESD protectors 120 and current sense circuitry 130 are discussed in more detail below.

Figure 3A:
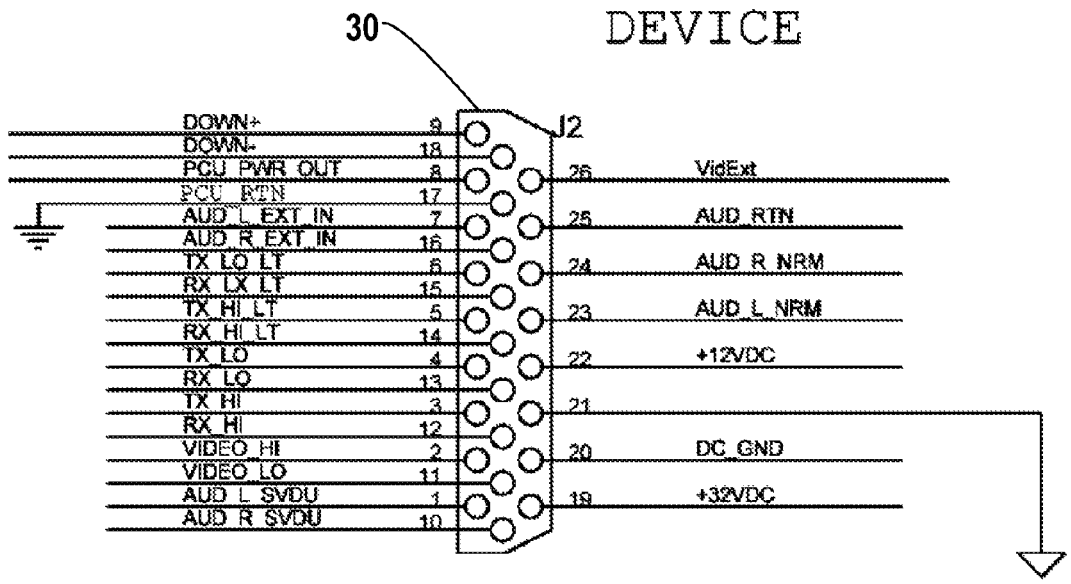
FIGS. 3A, B are pictorial diagrams with line-outs of the connectors on the USB repeater device.
Figure 3B:
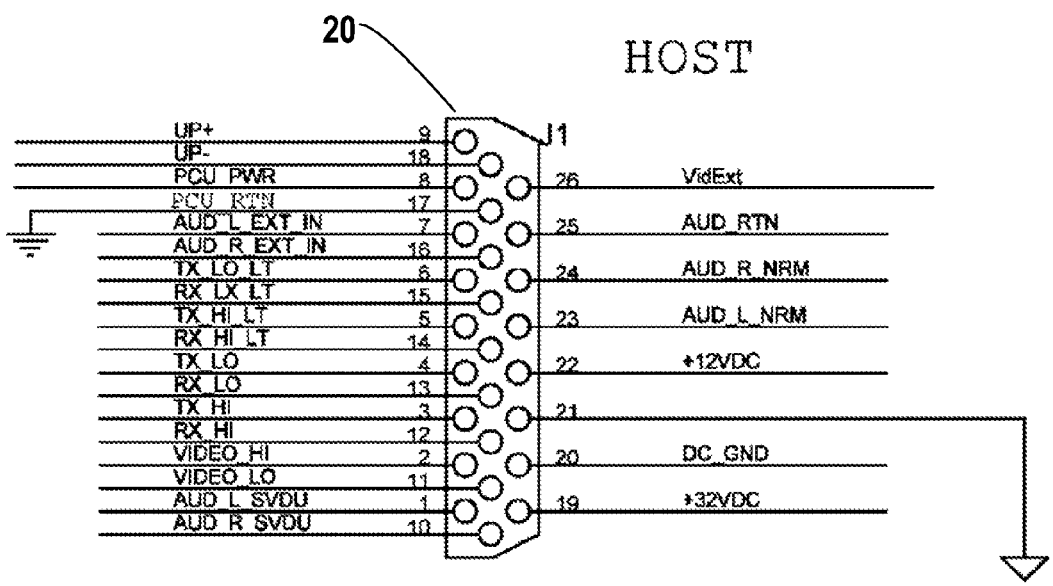

FIGS. 3A and 3B are pictorial diagrams of exemplary connector pin-outs. FIG. 3A is an exemplary pin-out of the DB-26 device connector 30 going to the passenger entertainment system 220, and FIG. 3B is an exemplary pin-out of the DB-26 host connector 20 going to the SEB 200. The repeater 10 simply passes most of the signals from the passenger entertainment system 220 to the SEB 200. However, the pins related to the PCU 230 are passed to circuitry within the repeater 10 for further handling. On the host connector 20, these include the PCU PWR J1-8 (and its associated return PCU RTN J1-17), UP+J1-9, and UP−(J1-18). On the device connector 30, these include the PCU PWR OUT J1-8 (and its associated return PCU RTN J1-17), DOWN+J1-9, and DOWN−(J1-18).

Figure 4A:
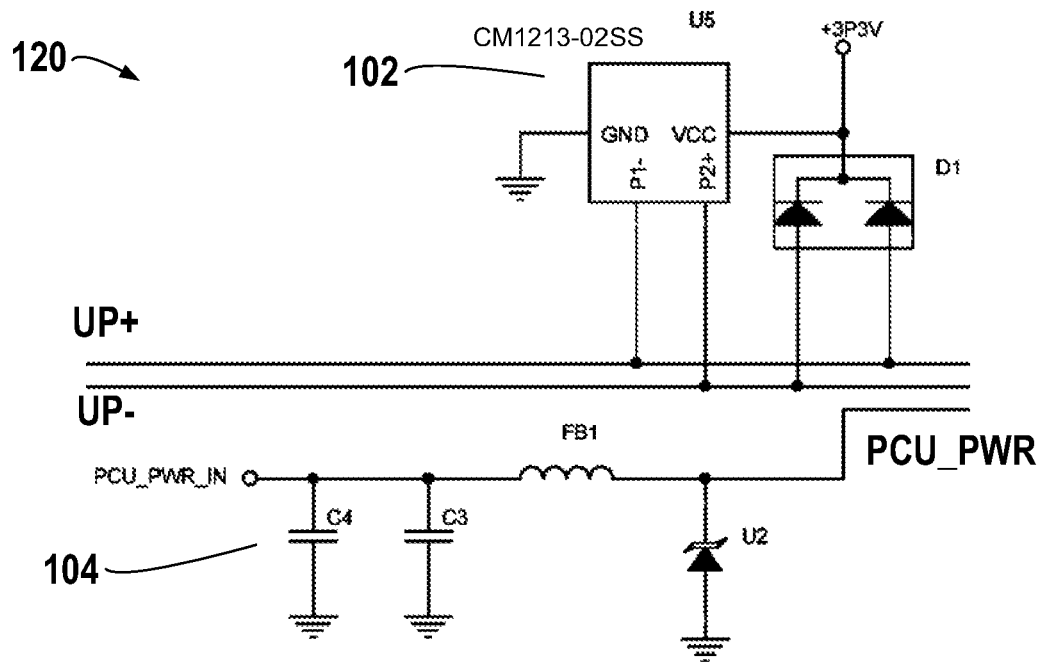
FIGS. 4A, B are circuit diagrams showing line conditioning and other circuitry of the USB repeater device.
Figure 4B:
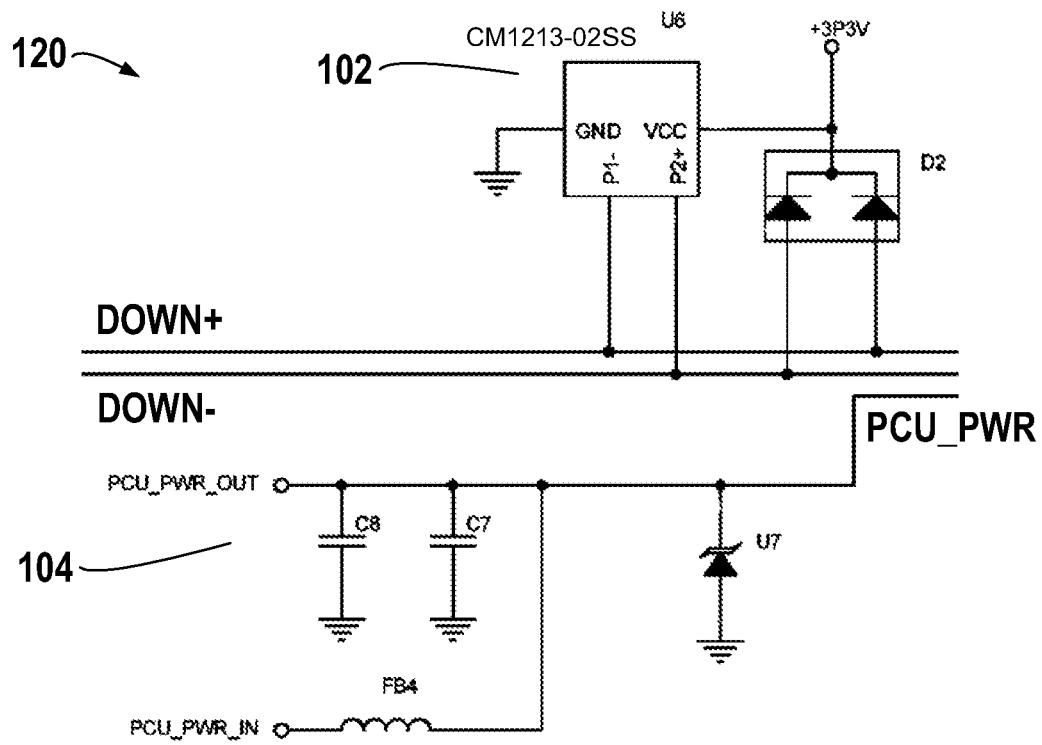

FIGS. 4A and 4B provide various conditioning circuitry 102, 104 that can be used on the data and power lines. The data line circuitry 102 can include electrostatic discharge protection circuitry, such as California Micro Devices' CM1213 Low Capacitance ESD protection arrays. The power line circuitry 104 can comprise filter capacitors C3, C4, C7, C8 to help reduce noise. Note that the shunt coils FB1, FB4 are optional and are not provided in a preferred embodiment.

Figure 5:
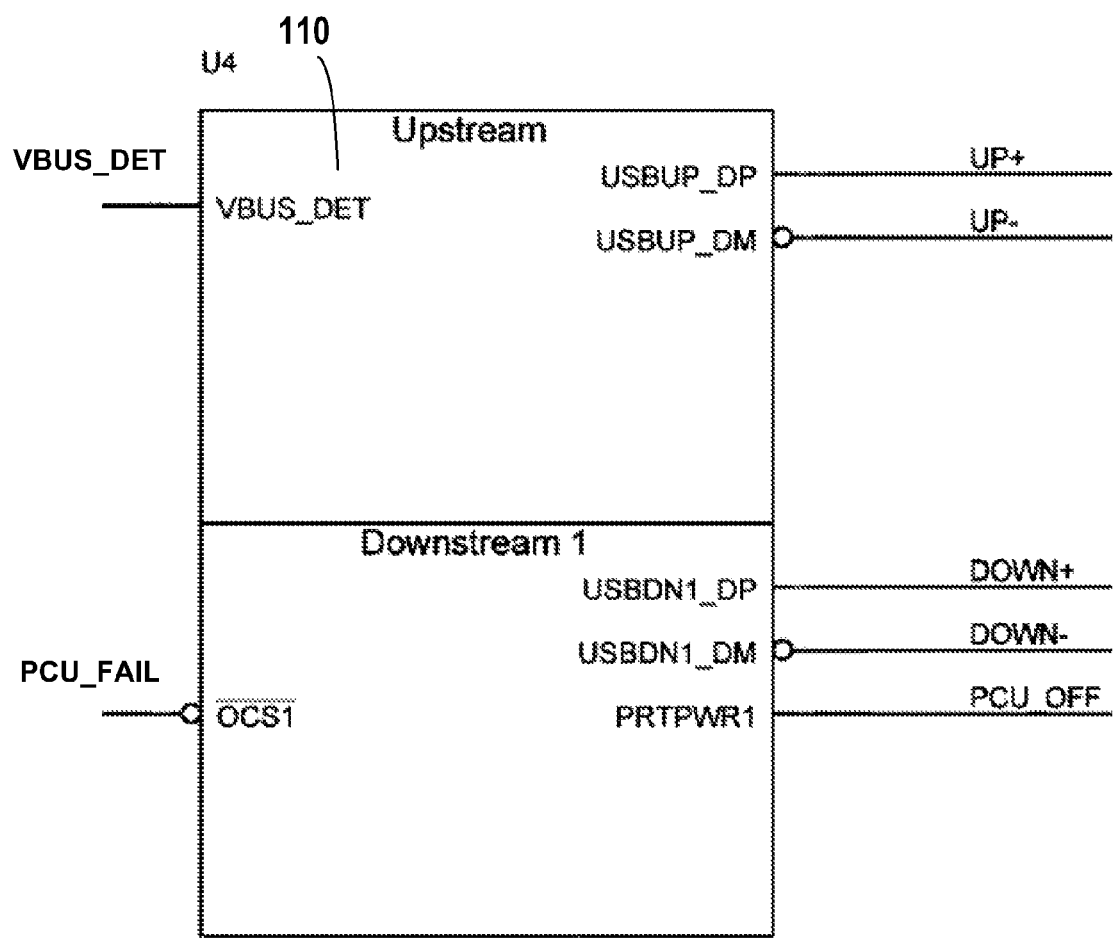
FIG. 5 is a circuit diagram showing the lines going into an actual USB repeater integrated circuit chip.

FIG. 5 provides an illustration of the signals going into the USB repeater chip 110 itself, the chip U4 being, e.g., an SMC USB2512/QFN36 chip. As can be seen, the UP+ and UP− signals from the host connector 20 are provided to the USBUP DP and USBUP DM (inverted) pins respectively. Also, the DOWN+ and DOWN− signals from the device connector 30 are provided to the USBDN1_DP and USBDN1_DM pins respectively. The VBUS_DET pin detects the state of upstream VBUS power signaling a connect event. The OCS1 is an over current sense signal that is an input from an external current monitor indicating an overcurrent condition. This is connected indirectly (through over current sense circuitry, illustrated in FIG. 6) to the PRTPWR1 pin that enables power to USB peripheral devices downstream.

Figure 6:
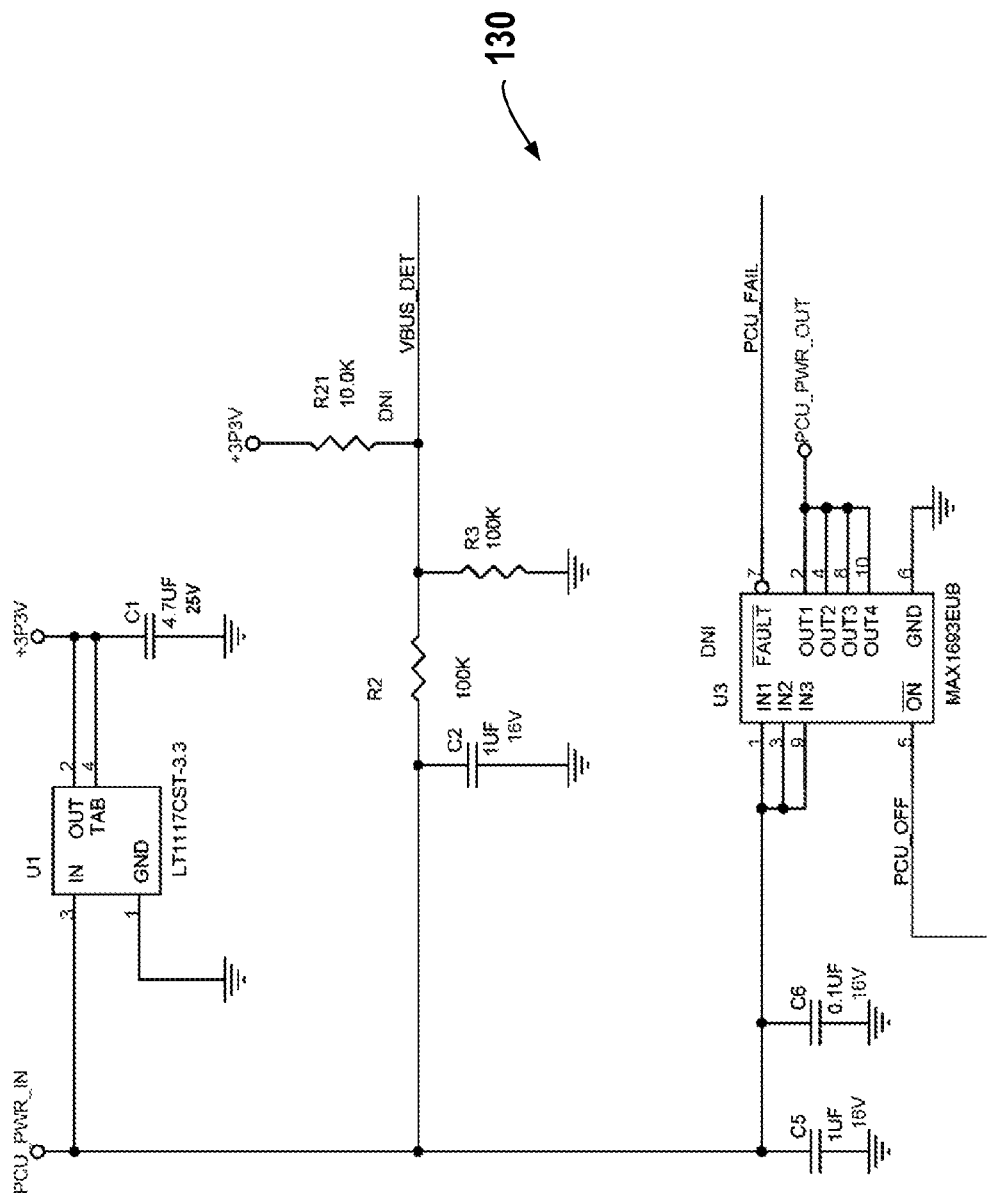
FIG. 6 is a circuit diagram showing the current-limiting circuitry for the USB repeater.

FIG. 6 provides an illustration of the USB current limiting and over-current sensing circuitry that may be employed. In a preferred embodiment, a USB current limiting chip U3 is provided, such as Maxim's MAX1693EUB, the specification sheet herein incorporated by reference. The PCU_OFF signal is provided to the PRTPWR1 connector (FIG. 5). Although the over current sense pursuant to the USB specification triggers at 500 mA, in a preferred embodiment, the design of the current system is set to trigger at 700 mA. Although in violation of the USB standard, this permits more power to be available on the PCU and can account for loss on the hub chip itself, cabling, etc.

The cable between the USB repeater 10 and the SEB 200 can be a simple straight through cable, having DB-26 connectors on both ends. The cable between the USB repeater 10 and the passenger entertainment system 220 can be constructed as having a DB-26 on one end, and a pigtail configuration on the other end, with each end of the pigtail going to a separate device (e.g., PCU 230, audio equipment 240, and display 250). All components used in the device and cables are preferably industrial grade for purposes of providing a robust and reliable connection.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components configured to perform the specified functions. For example, the present invention may employ various integrated circuit components, logic elements, and the like, which may carry out a variety of functions. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

The words "mechanism" and "element" are intended to be used generally and are not limited solely to mechanical embodiments. Numerous modifications and adaptations will be readily apparent to those skilled in this art without departing from the spirit and scope of the present invention.

TABLE OF REFERENCE CHARACTERS

10 USB repeater assembly
20 host connector
22 spring latches
24 host connector PCB pins
30 device connector
34 device connector PCB pins
40 shell top
42 shell bottom
100 PCB
102 USB data line conditioning circuitry
104 USB power line conditioning circuitry
110 USB repeater chip
120 ESD protectors
130 current sense
200 seat electronics box (SEB)
220 passenger entertainment system
230 personal control unit (PCU)
240 passenger audio components
250 passenger display components
260 seat electronics box cable
280 personal control unit cable

What is claimed is:

1. A USB repeater assembly, comprising:
   a host connector that connects to a seat electronics box (SEB) associated with a passenger entertainment system, the host connector comprising:
     a plurality of Universal Serial Bus (USB) pins associated with the USB connection to the PCU; and
     a plurality of entertainment device pins associated with other components of the passenger entertainment system;
   a device connector that connects to the passenger entertainment system, the passenger entertainment system comprising a personal control unit (PCU) configured as a USB device, the device connector comprising:
     a plurality of USB pins associated with a USB connection to the PCU; and
     a plurality of entertainment system device pins associated with other components of the passenger entertainment system;
   direct connections that connect the device connector plurality of entertainment system device pins to the host connector plurality of entertainment device pins;
   USB repeater circuitry to which the device connector plurality of USB pins and the host connector plurality of USB pins are connected via connectors; and
   a shell that encloses:
     at least a portion of the device connector;
     at least a portion of the host connector;
     the direct connections; and
     the USB repeater circuitry and its connectors.

2. The assembly according to claim 1, further comprising a circuit board comprising:
   the USB repeater circuitry in a form of an integrated circuit chip; and
   the direct connections in a form of circuit board traces.

3. The assembly according to claim 1, wherein the shell is made of metal, metalized plastic, or metalized composite that electrically shields the elements it encloses.

4. The assembly according to claim 1, further comprising electrostatic discharge protection circuitry connected to the USB pins.

5. The assembly according to claim 1, further comprising noise filters connected to a PCU power line.

6. The assembly according to claim 1, wherein dimensions of the shell and connectors do not exceed approximately 7.6 cm for a longest dimension that is a length, approximately 4.2 cm for an intermediate dimension that is a width, and approximately 1.75 cm for a shortest dimension that is a height.

7. The assembly according to claim 1, wherein the mass of the assembly does not exceed approximately 36 g.

8. The assembly according to claim 1, wherein the host connector and the device connectors are D-shell connectors.

9. The assembly according to claim 1 comprising over current sense circuitry that shuts down the USB device in an over current situation.

10. The assembly according to claim 1, wherein circuitry within the shell is industrial grade circuitry.

11. The assembly according to claim 3, wherein the shell is made of aluminum or an aluminum alloy.

12. The assembly according to claim 5, wherein the noise filters comprise capacitors connected to ground.

13. The assembly according to claim 5, further comprising a shunt coil in series with the PCU power line.

14. The assembly according to claim 8, wherein the host connector and the device connectors are DB-26 connectors.

15. The assembly according to claim 8, wherein the assembly is hot-swappable.

16. The assembly according to claim 9, wherein the over current situation only involves a USB current exceeding approximately 700 mA.

* * * * *